Patented July 29, 1952

2,605,193

UNITED STATES PATENT OFFICE 2,605,193

ASPHALT COMPOSITION

Robert E. Karll, Hammond, Ind., assignor to Standard Oil Company, Chicago, Ill., a corporation of Indiana No Drawing. Application November 30, 1950, Serial No. 198,485

5 Claims. (Cl. 106—274)

This invention relates to bituminous roadmaking compositions and pertains more specifically to such compositions which contain components whereby the bituminous material is more securely bonded to a filler, termed the aggregate, and the bonded admixture is made more resistant to weathering.

Many aggregates, especially when wet, are difficult to coat with bituminous materials. This is especially true of acidic stone, such as granite or other igneous rocks which are usually hydrophilic; even though the aggregate is dried before coating, the bond will tend to break down in the presence of water during wear.

A primary object of this invention is the provision of an improved bitumen coating composition that will exhibit improved adherence to aggregate of all types both at the time of coating and during wear. The invention has for other objects such other advantages or results as will hereinafter appear in the specification and claims.

The objects of the invention are accomplished by provision of a composition comprising a bitumen, preferably a petroleum asphalt, and a small amount, preferably about 1.0 to 5 percent of a sulfurized fatty acid containing combined sulfur introduced by sulfurizing the fatty acid with a sulfurizing agent such as elemental sulfur or sulfur chloride. The acid preferably contains from about 5 to 15 percent, by weight based on the fatty acid, of combined sulfur.

It has been known for a long time that wet aggregate is difficult to coat with asphalt unless by some means the physical properties of the aggregate or the wetting properties of the asphalt are altered. The addition of fatty acids to asphalt is a known method of altering its wetting and retention properties. Although fatty acids alone contribute improved coating characteristics to the asphalt with respect to the coating and retention on limestone aggregates, this additive is at best useless in altering the characteristics of asphalt for coating or retention on silicious aggregate. The addition to asphalts of unsaturated fatty acids which have been sulfurized entirely avoids this drawback; compositions prepared in this novel manner are substantially equally effective for coating either limestone or the hydrophilic, acidic stones.

The fatty acids which are sulfurized and employed in the novel composition include high molecular weight straight chain olefinic acids, having one or a plurality of double bonds and preferably about ten to twenty carbon atoms per molecule. These olefinic fatty acids include for example, oleic and linoleic acids. Unsaturated crude fatty acids and polymers thereof such as are obtained by springing caustic extracts of animal or vegetable fatty oils, by fractional distillation of crude acid stocks, and by propane precipitation of the said fatty acid stocks can also be effectively employed.

The foregoing acids are usually sulfurized by reaction of the unsaturated fatty acids with approximately a molar equivalent of elemental sulfur; preferably an excess of sulfur is employed. The acid is usually preheated to a temperature of at least about 200° F. and preferably about 250° F. The elemental sulfur is added slowly or incrementally. The reaction temperature is maintained between about 280° and 325° F. and preferably between 290° and 315° F. Higher temperatures effect considerable dehydrogenation with accompanying evolution of $H_2S$. At temperatures lower than the stated range, reaction is impractically slow.

A small amount, and preferably about 1 to 5 percent, by weight based on the asphalt, of the sulfurized acids are added to the asphalt.

It is important that the unsaturated acids be sulfurized before addition of the acids to the asphalts. This manner of preparation avoids heating a large volume of asphalt. Even if the asphalt were available in molten condition during some stage of the preparation of the composition nevertheless it is important to avoid the addition of the unsaturated fatty acid to the asphalt before sulfurization because elemental sulfur will react with asphalt and will make it stringy and rubber-like and difficult to handle without further treatment. The sulfurized fatty acids exhibit no change in acidity; little if any evolution of hydrogen sulfide is observed during reaction; and it appears that the introduced elemental sulfur reacts with a double bond of the unsaturated fatty acid so as to form a compound containing chemically combined sulfur.

Other methods can be employed to accomplish the sulfurization of the unsaturated fatty acids. For example, the fatty acids can be reacted with sulfur monochloride according to the process of the copending application of Beretvas Serial No. 107,822, filed July 30, 1949.

The bitumen constituting the binder material in the bituminous road-making compositions of this application can include petroleum residues and asphalts, including straight run, cracked and natural, oxidized and unoxidized asphalts, and coal tar pitches. The asphalt in the road-making composition can also be employed in the form of cut-back, an asphalt that is diluted with a solvent to provide greater fluidity.

The asphalt employed in the specific examples hereinafter reported consists of a mildly oxidized West Texas residuum. This asphalt was cut-back with approximately half its volume of a kerosene-type solvent. It conforms to the following specification:

Flash temperature, °F____ not less than 150° F.
Viscosity, furol at 140° F__ 100–200.
Distillation:
    Percent off at 437° F_ not more than 10.
    Percent off at 500° F_ 15–55.
    Percent off at 600° F_ 60–87.
    Residue at 680° F____ not less than 67%.

As will be shown in the specific examples the sulfurized fatty acids of the present application exhibit major improvement over a commercial additive now in widespread use for the provision of treated asphalt compositions. The following specific examples will serve to illustrate the present invention.

EXAMPLE I

A sulfurized oleic acid was provided by mixing 13 parts of sulfur added in three equal portions, with 100 parts of oleic acid maintained at 250° F. The mixture was stirred and heated at about 325° F. for four hours. During this heating a small volume of superheated steam was passed slowly through the reaction mixture. The resulting product contained 11.5 percent, by weight, of combined sulfur corresponding to one atom of sulfur per double bond and had an acidity of 174 mg. KOH per gram of sample. The oleic acid had an acidity of 177 mg. KOH per gram. Table 1 demonstrates the remarkably improved characteristics of asphalt containing only 1 to 2 percent by weight of sulfurized oleic acid as compared to unsulfurized oleic acid and to an additive now commercially employed in considerable quantity.

*Table 1*

| Additive | Percent Additive in Asphalt | Wet Aggregate | Coating | Stripping |
| --- | --- | --- | --- | --- |
| Commercial Agent | 2 | Ottawa Sand | Good | Moderate. |
| Do | 3 | Limestone A | Bad-Fair | Extensive. |
| Oleic Acid | 2 | Ottawa Sand | Bad | Do. |
| Do | 2 | Limestone A | Fair | Slight. |
| Do | 2 | Limestone B | Fair-Good | Do. |
| Sulfurized Oleic Acid | 2 | Ottawa Sand | Excellent | Very Slight. |
| Do | 1 | ___do___ | Fair-Good | Slight-Moderate. |
| Do | 2 | Limestone A | ___do___ | Slight. |
| Do | 2 | Limestone B | Good-Exc | Very Slight. |
| Do | 1 | ___do___ | ___do___ | Slight. |

The effectiveness of the so-prepared additive in altering the coating characteristics of asphalt was tested by preparing asphaltic mixtures having various percentages of the additive admixed therewith and then adding this treated asphalt to the wet aggregate, either limestone or sand, in a weight ratio of 4 parts by weight of asphalt to 100 parts by weight of aggregate. The mixture was stirred for approximately one minute and the amount of coating observed. An equal volume of water was added, the mixture was stirred, and the amount of stripping was evaluated.

EXAMPLE II

A sulfurized linoleic acid was prepared by adding 13 parts of elemental sulfur to 100 parts of linoleic acid at 250° F. After all of the sulfur was added the temperature was raised to 300° F. and maintained between 300° and 320° F. for four hours. The reaction mixture was stirred and steam at 320° F. was bubbled through the mixture during the reaction period. The product contained 11.34 percent combined sulfur corresponding to one sulfur per molecule of acid or every two double bonds. Table 2 illustrates the effects of 1 and 2 percent by weight of the sulfurized linoleic acid in a petroleum asphalt. The effectiveness of the so-prepared additive in altering the coating characteristics of asphalt was tested by preparing asphaltic mixtures having the said percentages of the additive admixed therewith and then adding this treated asphalt to wet aggregates, either limestone or sand, in a weight ratio of 4 parts by weight of treated asphalt to 100 parts by weight of aggregate. The mixture was stirred for approximately one minute and the amount of coating observed. An equal volume of water was added, the mixture was stirred, and the amount of stripping was evaluated.

*Table 2*

| Additive | Percent Additive in Asphalt | Wet Aggregate | Coating | Stripping |
| --- | --- | --- | --- | --- |
| Linoleic Acid | 2 | Limestone | Good | Very Slight. |
| Do | 2 | Ottawa Sand | Fair | Extensive. |
| Sulfurized Linoleic Acid | 2 | Limestone | Excellent | Very Slight. |
| Do | 1 | ___do___ | Good | Slight. |
| Do | 2 | Ottawa Sand | Excellent | Very Slight. |
| Do | 1 | ___do___ | Good | Slight. |

EXAMPLE III

There was used, in this example, a crude fatty acid mixture obtained by springing a caustic extract of a vegetable oil and comprising essentially 80 percent free unsaturated fatty acid and 20 percent glycerides. The fatty acid portion consists primarily of acids having a molecular weight range between about 200 and 300. A sulfurized crude fatty acid was prepared by adding 10 parts by weight of elemental sulfur to 100 parts of crude fatty acid at 250° F. After all of the sulfur had been added the temperature was raised to 300° F. and maintained between 300° and 315° F. for four hours. Steam at 310° F. was bubbled through the reaction mixture during the reaction period. The product contained 6.81 percent of combined sulfur. The effectiveness of the so-prepared additive in altering the coating characteristics of asphalt was tested by preparing an asphalt mixture having various percentages of the additive admixed therewith and then adding this treated asphalt to wet aggregates, either limestone or sand, in a weight ratio of 4 parts by weight of asphalt to 100 parts by weight of aggregate. The mixture was stirred for approximately one minute and the amount of coating was observed. An equal volume of water was added, the mixture was stirred, and the amount of stripping was evaluated, as shown in the following table:

Table 3

| Additive | Percent Additive in Asphalt | Wet Aggregate | Coating | Stripping |
|---|---|---|---|---|
| Sulfurized Crude Fatty Acid | 2 | Limestone | Very Good | Slight. |
| Do | 2 | Ottawa Sand | Fair-Good | Do. |

The compositions so provided by the described invention and illustrated by the foregoing specific examples alter the characteristics of asphalts to the extent that an untreated asphalt, which will coat poorly and exhibit excessive stripping from a wet sand aggregate and will exhibit equally poor characteristics when an unsaturated fatty acid is added thereto, will show excellent results both with respect to coating and stripping when the unsaturated fatty acid, before addition to the asphalt, is sulfurized in the manner previously described.

Having described my invention, I claim:

1. A bituminous composition of matter comprising an asphalt and about 0.5 percent to 5 percent by weight, based on the asphalt, of the reaction product of heating an unsaturated fatty acid having between ten and twenty carbon atoms per molecule with from 5 to 15 percent by weight, based on the fatty acid, of elemental sulfur for a sufficient time to effect reaction therebetween.

2. The composition of claim 1 in which the fatty acid is oleic acid.

3. The composition of claim 1 in which the fatty acid is lineoleic acid.

4. A bituminous composition of matter comprising an asphalt and about 0.5 to 5 percent by weight, based on the asphalt, of the reaction product of heating an unsaturated fatty acid having between ten and twenty carbon atoms per molecule with from 5 to 15 percent by weight, based on the fatty acid, of elemental sulfur at a temperature between about 100° and 450° F. and for a period of about 0.5 to 4 hours.

5. A bituminous road-making composition comprising a cut-back asphalt consisting of predominantly a petroleum asphalt and the remainder a light oil solvent, and about 0.5 to 5 percent by weight, based on the asphalt, of the reaction product of heating an unsaturated fatty acid having between ten and twenty carbon atoms per molecule with from 5 to 15 percent by weight, based on the fatty acid, of elemental sulfur at a temperature between about 100° and 450° F. and for a period of about 0.5 to 4 hours.

ROBERT E. KARLL.

REFERENCES CITED

The following references are of record in the file of this patent:

UNITED STATES PATENTS

| Number | Name | Date |
|---|---|---|
| 109,724 | Duempelman | Nov. 29, 1870 |
| 2,040,671 | Richardson | May 12, 1936 |

FOREIGN PATENTS

| Number | Country | Date |
|---|---|---|
| 610,629 | Great Britain | Oct. 19, 1948 |